United States Patent [19]

Colovas et al.

[11] Patent Number: 4,475,380
[45] Date of Patent: Oct. 9, 1984

[54] FUEL EFFICIENCY MONITOR

[75] Inventors: Denny D. Colovas, Dearborn; David J. Rutkowski, Grosse Ile; Wendell J. Ver Ploeg, West Bloomfield, all of Mich.

[73] Assignee: Ford Motor Company, Dearborn, Mich.

[21] Appl. No.: 432,891

[22] PCT Filed: Aug. 19, 1982

[86] PCT No.: PCT/US82/01122
§ 371 Date: Aug. 19, 1982
§ 102(e) Date: Aug. 19, 1982

[87] PCT Pub. No.: WO84/00814
PCT Pub. Date: Mar. 1, 1984

[51] Int. Cl.³ .................................... G01M 15/00
[52] U.S. Cl. ........................................ 73/114; 73/112
[58] Field of Search .................. 73/113, 114, 112; 364/518

[56] References Cited

U.S. PATENT DOCUMENTS

| | | | |
|---|---|---|---|
| 3,347,092 | 10/1967 | Stutson | 73/114 |
| 3,405,554 | 10/1968 | Gauthier | 73/114 |
| 3,930,237 | 12/1975 | Villers | 364/518 |

FOREIGN PATENT DOCUMENTS

| | | | |
|---|---|---|---|
| 2451460 | 10/1980 | France | 73/114 |
| 678354 | 8/1979 | U.S.S.R. | 73/113 |

Primary Examiner—Jerry W. Myracle
Attorney, Agent, or Firm—Peter Abolins; R. D. Sanborn

[57] ABSTRACT

A fuel efficiency monitor (10) for a tractor for agricultural use includes sensors (22, 24) for detecting engine operating conditions, an engine map means (38, 42) for correlating efficiency to the engine operating parameters, and a display (14) to display an indication of efficiency to the tractor operator.

5 Claims, 6 Drawing Figures

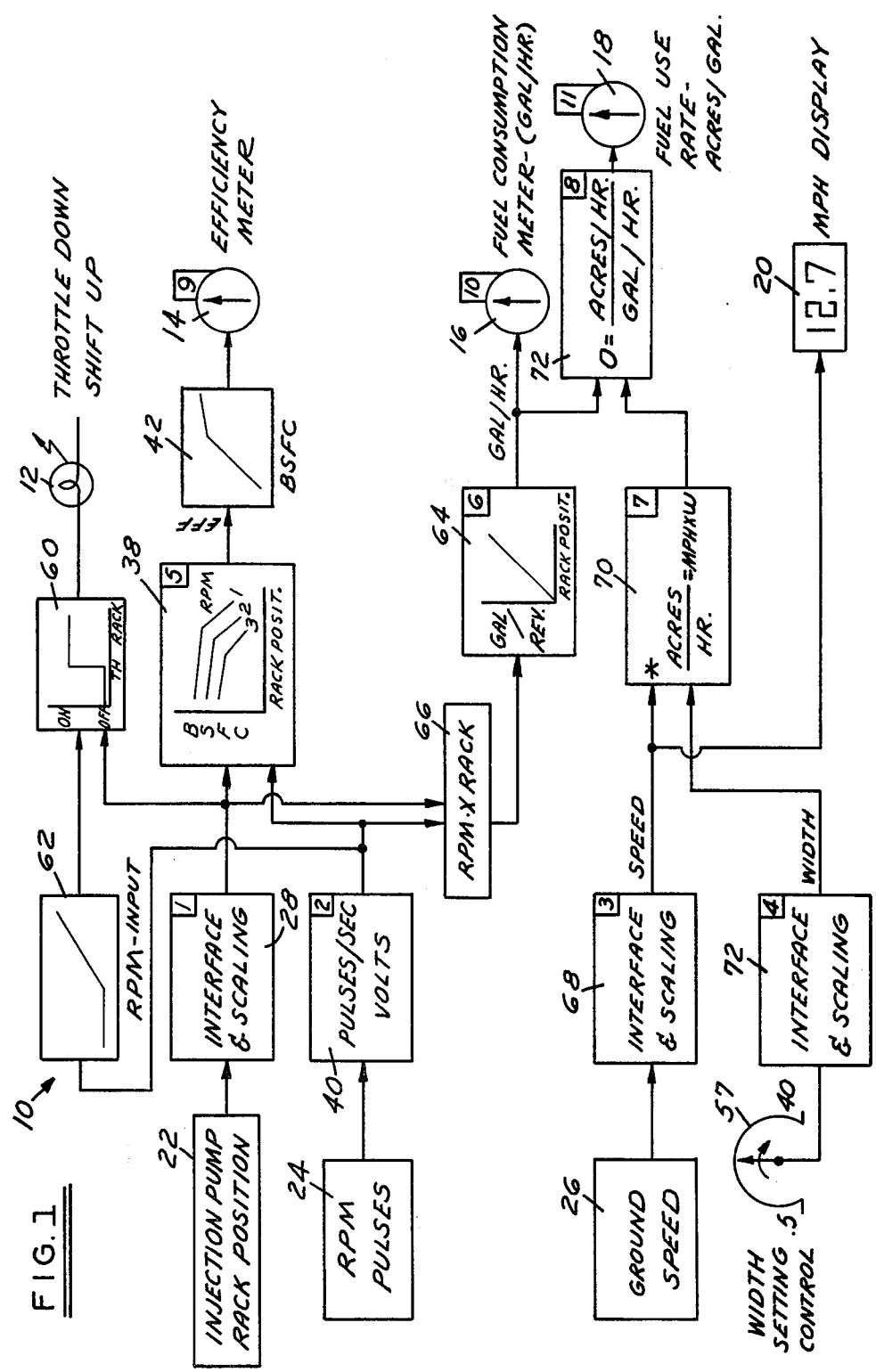

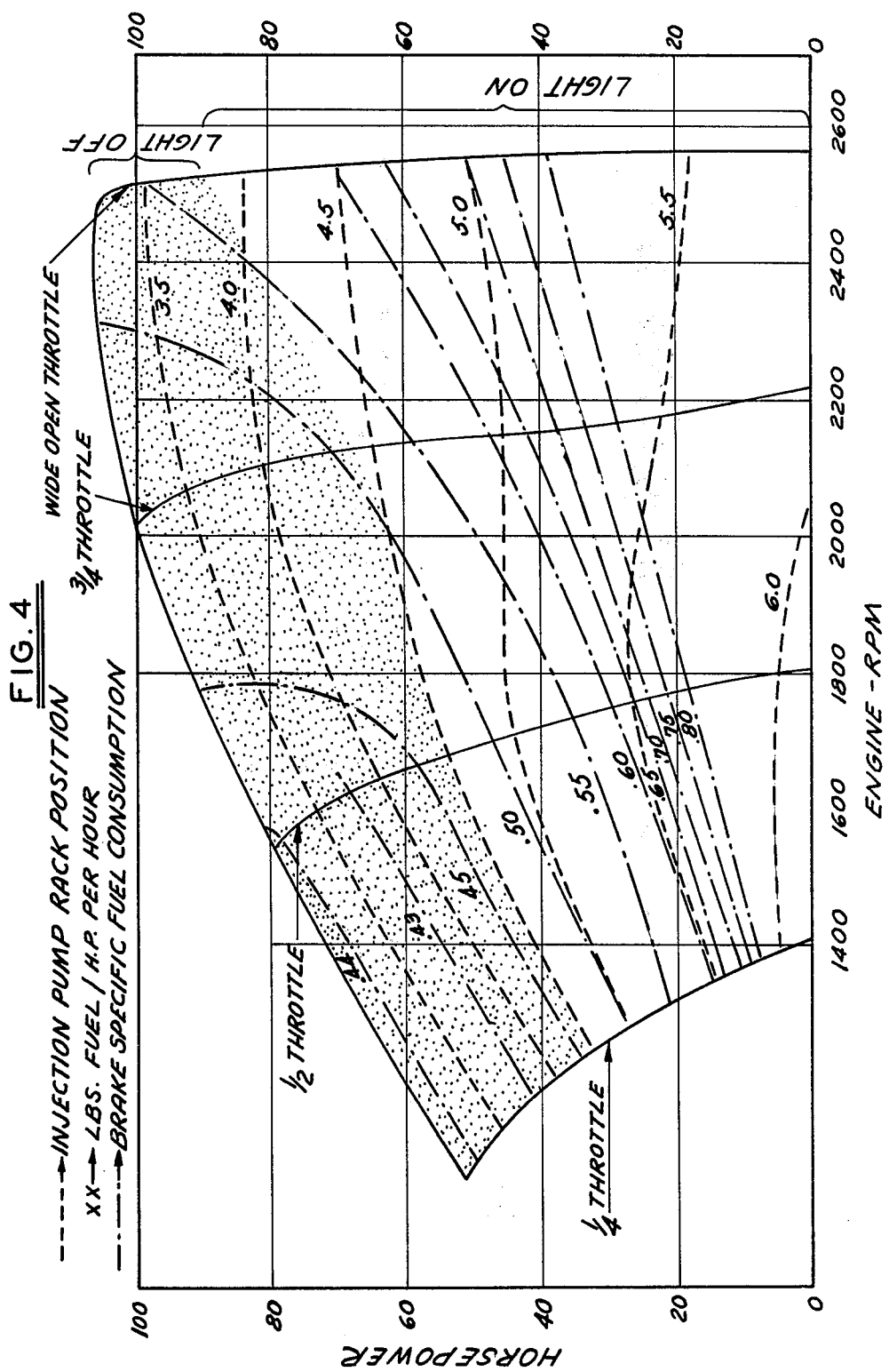

FUEL EFFICIENCY MONITOR

TECHNICAL FIELD

This invention relates to an apparatus for providing an indication of efficiency of a motor vehicle, especially a draft vehicle for agricultural use having a driving engine.

BACKGROUND ART

When working the soil with a vehicle adapted to be used in agriculture and having a working implement attachment, the problem arises of performing the work to be accomplished at an optimum efficiency. U.S. Pat. No. 3,686,935 to May shows a method and apparatus for monitoring the performance of a draft vehicle for agricultural use. The draft vehicle has a fuel injection engine, driving wheels, a transmission connecting the engine to the wheels, a torque converter, and measuring elements to measure the circumferential speed of the driving wheels, the speed of the vehicle, the speed of the engine, the rate of fuel supply to the engine, the torque supplied to the converter, and the torque supplied by the converter. The vehicle parameters, including vehicle speed and torque, are processed into electrical signals relating to vehicle performance and efficiency for display within the view of the vehicle operator. It would be advantageous to obtain some indication of efficiency without the need to measure ground speed and torque directly. The system taught by the May patent is for use with a vehicle having a torque converter and directly measures engine and converter torque.

U.S. Pat. No. 3,998,094 issued to Martin shows a method of and apparatus for measuring the distance traveled per amount of fuel consumed by a vehicle. Pulses are applied to a fuel injection nozzle and to an oscillator drive and trigger circuit. Oscillator drive and trigger circuit generates a pulse repetition frequency signal and a pulse length signal. These two signals are fed to a computer, which generates a fuel flow rate signal which is applied to a divider and to an integrator. Vehicle road speed signals are applied to the divider. The divider divides the vehicle road speed by the fuel flow rate, and generates a signal indicative of distance traveled per amount of fuel consumed. This electronic system processes speed and fuel consumption information into a signal which is proportional to the distance traveled per unit of fuel consumed. However, the apparatus does not give an indication of efficiency for the operator of the vehicle to use.

U.S. Pat. No. 4,113,046 issued to Arpino includes a position sensor which generates a signal proportional to the position of the accelerator pedal. This signal is amplified and differentiated so that a signal whose magnitude is proportional to the rate of change of the position of the throttle is generated. Similarly, a velocity transducer generates a signal which is proportional to vehicle speed. This signal is amplified and differentiated into a signal whose magnitude is proportional to the rate of change of the vehicle speed. These two signals are applied to a differential amplifier whose output drives the meter. The output of the differential amplifier is an efficiency signal whose magnitude is proportional to the difference between the amplitudes of the throttle rate signal and the acceleration signal. The meter indicates whether or not the vehicle is accelerating efficiently. Clearly, it would be advantageous to have a meter which indicates efficiency not only during acceleration but also during steady state operation so that a vehicle operator can make appropriate throttle and gear shift adjustments.

U.S. Pat. No. 4,157,030 issued to Keely includes a system for deriving the fuel consumption of a vehicle. The system includes a vehicle speed transducer and a control unit coupled to a fuel injector to produce pulses proportionate to the rate of fuel flow. The vehicle speed and fuel flow signals are combined with the signal indicative of the number of gallons remaining to produce a signal which relates to how much further the vehicle can travel before the fuel supply is exhausted. Again, such an apparatus does not provide a measure of efficiency which can be used by the vehicle driver to adjust the throttle or gear position of the vehicle.

U.S. Pat. No. 3,006,144 issued to Arnett et al, teaches a fuel control apparatus responsive to approaching engine instability. The object of the apparatus is to modulate the fuel supply to the engine whenever the engine approaches its unstable range of operation. A speed tachometer generates a signal which is proportional to engine speed. Similarly, a fuel flow meter generates a signal which is proportional to the fuel flow to the engine. These signals are compared to provide the control of a fuel valve. Thus, signals corresponding to engine speed and fuel flow are used to make adjustments in the rate of fuel flow in accordance with the known characteristics of a particular engine when the system is properly adjusted. Again, there is not taught an engine efficiency meter which can provide an indication for the operator to adjust the vehicle throttle or gear shift to improve efficiency. These are some of the problems this invention overcomes.

DISCLOSURE OF THE INVENTION

In accordance with an embodiment of this invention, a fuel efficiency monitor for a vehicle, especially a draft vehicle for agricultural use having a driving engine, includes sensor means for detecting engine operating conditions, an engine map means for correlating efficiency to the engine operating parameters, and a display means to display an indication of efficiency to the operator of the vehicle engine. A first sensor means measures a RPM related parameter of the driving engine. A second sensor means measures a fuel usage related parameter of the driving engine. The engine map means is coupled to the first and second sensor means for correlating the RPM parameter and the fuel usage parameter to a fuel efficiency related parameter. The display means is coupled to the engine map means for giving an indication of the efficiency of operation of the vehicle engine.

In accordance with one particular embodiment of this invention, the first sensor means includes an engine RPM detection means to produce a train of pulses with a repetition rate related to the revolutions per minute of the engine and a converter means having an output voltage level related to the input pulse repetition rate. The second sensor means includes a rack position means to detect the position of a rack controlling the operation of a fuel injector thereby determining the amount of fuel injected into the vehicle engine per stroke. The engine map means includes a stored correlation for the vehicle engine relating the rack position, the engine speed, and the brake specific fuel consumption of the engine. A display means includes a conversion means for relating brake specific fuel consumption to vehicle engine efficiency so that the efficiency has at least two scales of relationships to the brakes specific fuel consumption in the region of vehicle operation. The display means further includes an indicator to convey vehicle efficiency information to the vehicle operator.

BRIEF DESCRIPTION OF THE DRAWINGS

FIG. 1 is a block diagram of a fuel efficiency monitor in accordance with an embodiment of this invention;

FIG. 4 is an engine map of throttle position, injection pump rack position and brake specific fuel consumption plotted on coordinates of engine RPM versus horsepower.

BEST MODES FOR CARRYING OUT THE INVENTION

Figure 2:
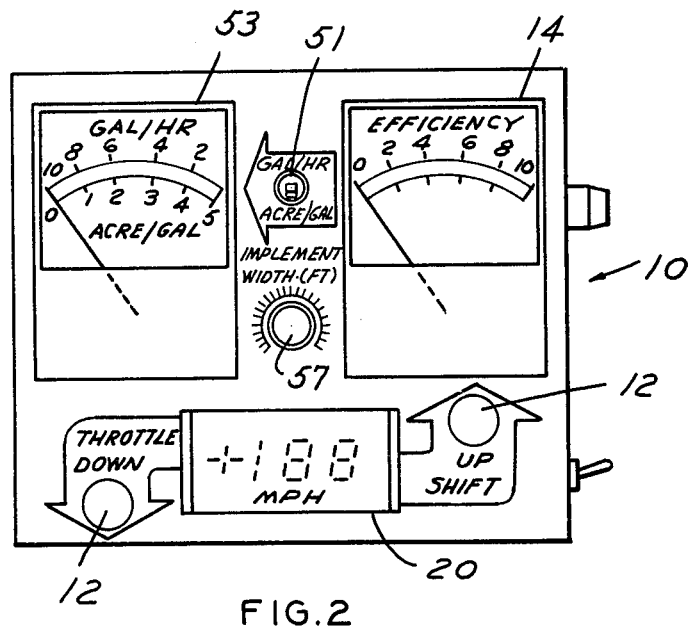
FIG. 2 is a front view of the exterior of a meter in accordance with an embodiment of this invention.

Referring to FIGS. 1 and 2, a fuel efficiency monitor 10 includes various indications of engine operation including a shift lamp indicator 12, an efficiency meter 14, a fuel consumption meter 16, a fuel-use rate meter 18 and a miles-per-hour display 20. Of course, if desired, any one or any subcombination of these meters may be used. Vehicle operation sensors for monitor 10 include injection pump rack position sensor 22, engine speed sensor 24, and vehicle ground speed sensor 26. Depending upon the particular output meter desired, some vehicle operation sensors may be omitted.

The inputs for efficiency meter 14 include injection pump rack position sensor 22 and engine speed sensor 24. Injection pump rack position sensor 22 is coupled to an interface and scaling module 28 which is in turn coupled to an engine map computer 38. The output of engine speed sensor 24 is coupled to a repetition rate to voltage level transformer 40 which has its output coupled to computer 38. The output of computer 38 is coupled to a scale converter 42 which has its output coupled to meter 14.

The position of the rack governing the fuel injection pump is detected by sensor 22 to determine the amount of fuel being injected per stroke into each cylinder. This position is converted into an appropriately scaled voltage by scaler 28. Engine speed is detected by sensor 24 in any number of known ways such as a magnetic sensor counting the revolutions of the crankshaft. Transformer 40 converts the pulses received from engine speed sensor 24 to a voltage level which is then applied to the input of computer 38. The inputs of the rack position and the engine speed are combined with stored information in the computer 38 to determine the brake specific fuel consumption of the vehicle. The brake specific fuel consumption of the vehicle is then applied to scale converter 42 wherein a conversion to efficiency is made. The output of scale converter 42 is applied to efficiency meter 14 for visual display to the vehicle operator. Advantageously, the conversion from the brake specific fuel consumption to the efficiency is done using two scaled relationships between brake specific fuel consumption and efficiency to produce a more easily read efficiency output from efficiency meter 14 over the range of operation of the vehicle. That is, the efficiency can be related to brake specific fuel consumption by at least two different multiplication factors in different regions of vehicle operation.

The information stored in computer 38 is based upon engine mapping techniques wherein the engine is subjected to various operating conditions and parameters so as to determine the relationships between various engine operating parameters under the conditions. FIG. 4 illustrates a typical way of displaying the stored information and includes a series of curves wherein the horizontal axis includes input information, and the curves are used to determine the corresponding position on the vertical axis which would then constitute the output information. Alternatively, a look-up table can be used wherein one input is on one axis and another input is on another axis thereby defining output information on the matrix.

Figure 3A:
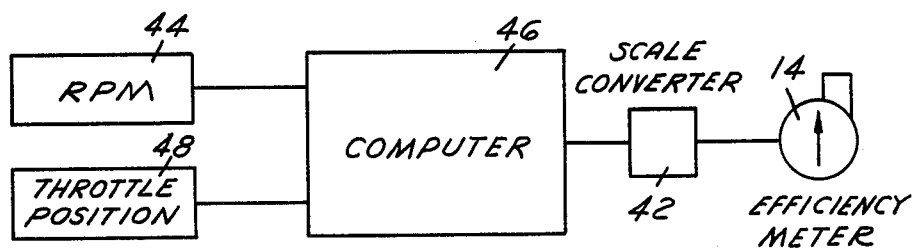
FIGS. 3A and 3B are block diagrams for other embodiments of an efficiency meter using inputs of RPM and throttle position, and rack position and throttle position, respectively.
Figure 3B:
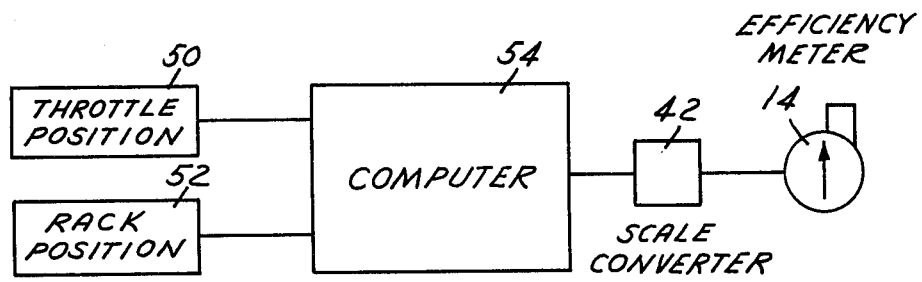

Referring to FIGS. 3A and 3B, two alternate input combinations are shown for driving meter 14. In FIG. 3A an RPM sensor 44 provides one input to a computer 46 and a throttle position sensor 48 provides another input to computer 46. Computer 46 includes stored information relating an output of brake specific fuel consumption to the input of RPM and throttle position. As before, a scale converter 42 converts the brake specific fuel consumption to an efficiency parameter which is displayed by meter 14. The information stored in computer 46 differs from that stored in 38 in that it relates the throttle position, that is, the depression of the accelerator pedal, to the engine revolution speed.

Referring to FIG. 3B, the combination of the two input sensors includes the throttle position sensor 50 and a rack position sensor 52 which both apply inputs to a computer 54. Computer 54 applies an output to converter 42 which in turn applies an output to meter 14. The information stored in computer 54 relates the throttle position and the rack position to the brake specific fuel consumption.

The engine maps required for use in computers 38, 46 and 54 can be derived from the engine map shown in FIG. 4. The vertical coordinate of the graph representation is horsepower and the horizontal coordinate is engine speed in revolutions per minute (RPM). Plotted on these axes are solid lines indicating the throttle settings, dash lines indicating the injection pump rack position, and dot-dash lines indicating the brake specific fuel consumption. Values between the indicated lines can be obtained by interpolation. Generally, for increased efficiency at a given horsepower, the engine RPM is reduced to decrease the brake specific fuel consumption as long as a desirable, or adequate, speed is maintained as indicated by the throttle setting.

Referring to FIG. 2, there is shown a front view of a fuel monitor 10 display surface in accordance with an embodiment of this invention. In particular, there are needle meters showing efficiency, gallons used per hour, and acres covered per gallon. A switch 51 permits switching the reading of a single dial 53 between gallons per hour and acres per gallon. Further, a dial width setting control 57 permits dialing in the width of the implement in feet which is being used in connection with the vehicle. Still further, lamp indicator 12 indicates when increased efficiency can be obtained by upshifting and throttling down. Indicator 20 displays the speed of the vehicle in miles per hour.

Referring again to FIG. 1, lamp indicator 12 can be used to indicate when improved efficiency can be obtained by shifting into a higher gear and by throttling down so as to reduce accelerator pedal actuation. A computer 60 having stored information has an output coupled to actuate lamp 12. One input to computer 60 is from the output of interface and scaling converter 28 giving injection pump rack position. The other input to computer 60 is from a threshhold generator 62 which has an input from transformer 40 giving engine speed in engine RPMs. The function of threshhold generator 62 is to provide an increasing threshhold after a predetermined level of RPM is reached. As a result, computer 60 provides an on-off output for lamp 12 in response to a rack position or a fuel usage of above a certain threshhold, the threshhold being increased with RPM after a certain point.

Referring to FIG. 4, the shaded area indicates when the light would be off while the remainder of the engine map would indicate when the light is on. When the light is on, the vehicle operator can throttle down and shift up in order to improve efficiency and to enter the shaded region.

Referring to FIG. 1, fuel consumption meter 16 is actuated by a computer 64 which has an input from a multiplier 66. Inputs are applied to multiplier 66 from transformer 40 and scaling module 28. Multiplier 66 combines the input from the injection pump rack position and the RPM pulses to produce an indication of fuel usage per time. The stored information in computer 64 includes a relationship between fuel usage per a given time and gallons per revolution. This information is applied from computer 64 to meter 16.

Still referring to FIG. 1, fuel-use rate meter 18 requires the additional inputs of ground speed sensor 26 and an input from width setting control 57. Buffer 68 is coupled to ground speed sensor 26 and provides a speed input to computer 70. Similarly, a buffer 72 is coupled to width setting control 57 and provides an input to computer 70. Speed can also be displayed directly on a display 20 as indicated by applying the output of buffer 68 to display 20. Computer 70 converts miles per hour times the width of the implement to the number of acres per hour that are plowed. The output of computer 70 containing this information as well the output of computer 64 containing gallons per hour is applied to a computer 72 which combines the two signals using division to obtain the acres per hour at the current fuel usage.

Figure 5:
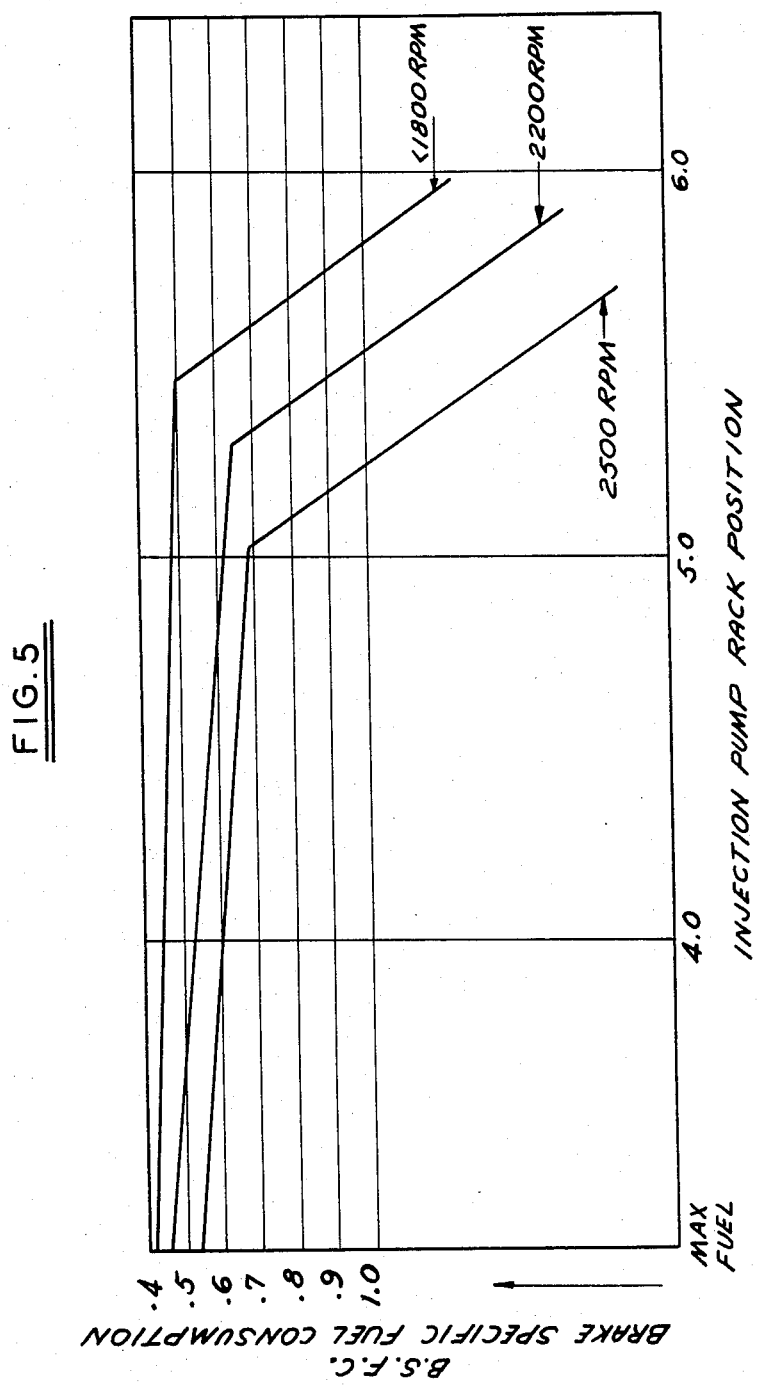
FIG. 5 is a simplified presentation of the engine map of FIG. 4 and plots engine RPM as a function of injection pump rack position and brake specific fuel consumption.

Referring to FIG. 5, another presentation of the information presented in FIG. 4 is illustrated using a horizontal axis of injection pump rack position and a vertical axis of brake specific fuel consumption. The curves of the graphical representation are for different engine speeds in RPMs. As noted before, this information can be stored in tabular form or can be stored as information characterizing the graphical representation. That is, to store the curve representing 2500 RPM it is possible to store the coordinate of the point of inflection of the curve and then the slope of the two adjoining portions of the graph. This latter storage approach would typically be used in connection with computer 38.

Various modifications and variations will no doubt occur to those skilled in the various arts to which this invention pertains. For example, the particular sensors used to obtain engine operating parameters may be varied from that disclosed herein. These and all other variations which basically rely on the teachings through which this disclosure has advanced the arts are properly considered within the scope of this invention.

INDUSTRIAL APPLICABILITY

The fuel efficiency monitor of this invention assists in achieving efficient operation of a tractor thereby improving fuel economy.

We claim:

1. A fuel efficiency monitor for a vehicle, especially a draft vehicle for agricultural use and having a driving engine, said monitor including:
    a first sensor means for measuring an rpm related parameter of the driving engine;
    a second sensor means for measuring a fuel usage related parameter of the driving engine;
    an engine map means coupled to said first and second sensor means for correlating the rpm parameter and the fuel usage parameter to a fuel efficiency related parameter;
    a display means coupled to said engine map means for giving an indication of the efficiency of operation of the vehicle engine;
    said first sensor means including an engine rpm detector means to produce a train of pulses with a repetition rate related to the revolutions per minute of the engine and a converter means having an output voltage level related to the input pulse repetition rate;
    said second sensor means including a rack position means to detect the position of a rack controlling the operation of a fuel injector thereby determining the amount of fuel injected into the vehicle engine per stroke;
    said engine map means including a stored correlation for the vehicle engine relating rack position, the engine speed and the brake specific fuel consumption of the engine; and
    said display means including a conversion means for relating brake specific fuel consumption to vehicle engine efficiency so that the efficiency is related to the brake specific fuel consumption by at least two different multiplication factors in different regions of vehicle operation, and said display means includes an indicator to convey vehicle efficiency information to the vehicle operator.

2. a fuel efficiency monitor for a vehicle, especially a draft vehicle for agricultural use and having a driving engine, said monitor including:
    a first sensor means for measuring an rpm related parameter of the driving engine;
    a second sensor means for measuring a fuel usage related parameter of the driving engine;
    an engine map means coupled to said first and second sensor means for correlating the rpm parameter and the fuel usage parameter to a fuel efficiency related parameter;
    a display means coupled to said engine map means for giving an indication of the efficiency of operation of the vehicle engine;
    said first sensor means including an engine rpm detection means to produce a train of pulses with a repetition rate related to the revolutions per minute of the engine and a converter means having an output voltage level related to the input pulse repetition rate;
    said second sensor means including a throttle position means for indicating the position of a driver operated accelerator pedal for the vehicle thereby determining the amount of fuel desired to be injected into the vehicle engine;

said engine map means including a stored correlation for the vehicle engine relating the accelerator pedal position, the engine speed and the brake specific fuel consumption of the engine; and said display means including a conversion means for relating brake specific fuel consumption to vehicle engine efficiency so that the efficiency is related to the brake specific fuel consumption by at least two different multiplication factors in different regions of vehicle operation, and said display means includes an indicator to convey vehicle efficiency information to the vehicle operator.

3. A fuel efficiency monitor for a vehicle, especially a draft vehicle for agricultural use and having a driving engine, said monitor including:

a first sensor means for measuring an rpm related parameter of the driving engine;

a second sensor means for measuring a fuel usage related parameter of the driving engine;

an engine map means coupled to said first and second sensor means for correlating the rpm parameter and the fuel usage parameter to a fuel efficiency related parameter;

a display means coupled to said engine map means for giving an indication of the efficiency of operation of the vehicle engine;

said first sensor means including a rack position means to detect the position of a rack controlling the operation of a fuel injector thereby determining the amount of fuel injected into the vehicle per stroke, the amount of fuel injected being adjusted as a function of engine speed;

said second sensor means including a throttle position means for indicating the position of a driver operated accelerator pedal for the vehicle thereby determining the amount of fuel desired to be injected into the vehicle engine;

said engine map means including a stored correlation for the vehicle engine relating the accelerator pedal position, the rack position and the brake specific fuel consumption of the engine; and said display means including a conversion means for relating brake specific fuel consumption to vehicle efficiency so that the efficiency is related to the brake specific fuel consumption in the region of vehicle operation, and said display means includes an indicator to convey vehicle efficiency information to the vehicle operator.

4. A fuel efficiency monitor for a vehicle, especially a draft vehicle for agricultural use and having a driving engine, said monitor including:

a first sensor means for measuring an rpm related parameter of the driving engine;

a second sensor means for measuring a fuel usage related parameter of the driving engine;

an engine map means coupled to said first and second sensor means for correlating the rpm parameter and the fuel usage parameter to a fuel efficiency related parameter;

a display means coupled to said engine map means for giving an indication of the efficiency of operation of the vehicle engine;

said first sensor means including an engine rpm detection means to produce a train of pulses with a repetition rate related to the revolutions per minute of the engine and a converter means having an output voltage level related to the input pulse repetition rate;

said second sensor means including a rack position means to detect the position of a rack controlling the operation of a fuel injector thereby determining the amount of fuel injected into the vehicle engine per stroke;

said engine map means including a first computation means for combining the outputs of said first and second sensors to obtain fuel usage per unit time, and a first conversion means for adjusting the units of the fuel usage per unit time to be gallons per hour; and said display means indicating fuel consumption in gallons per hour to the vehicle operator.

5. A fuel efficiency monitor as recited in claim 4 further comprising:

a third sensor means for indicating ground speed of the vehicle;

a fourth sensor means for indicating the effective work width of the vehicle, a second computation means coupled to said third and fourth sensors for computing acres per hour of vehicle coverage; and a third computation means having an input coupled to said second computation means and said engine map means for generating an indication of fuel use rate in acres per hour.

* * * * *